3,007,389
CAMERA CONSTRUCTION
Edward E. Hollingworth, Hazel Park, Mich., assignor to Camera Corporation of America, Detroit, Mich., a corporation of Michigan
Filed Oct. 31, 1955, Ser. No. 543,687
3 Claims. (Cl. 95—55)

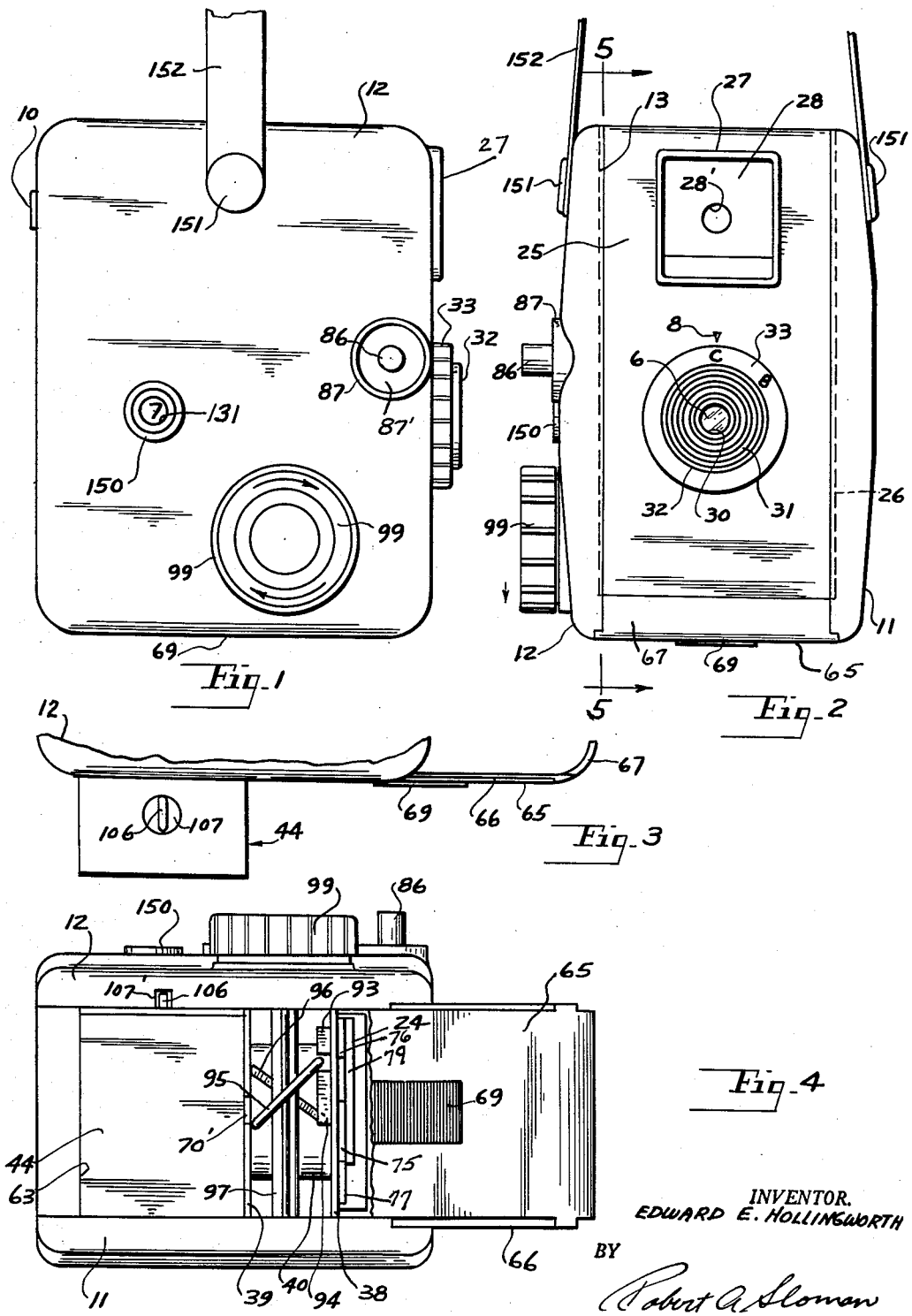

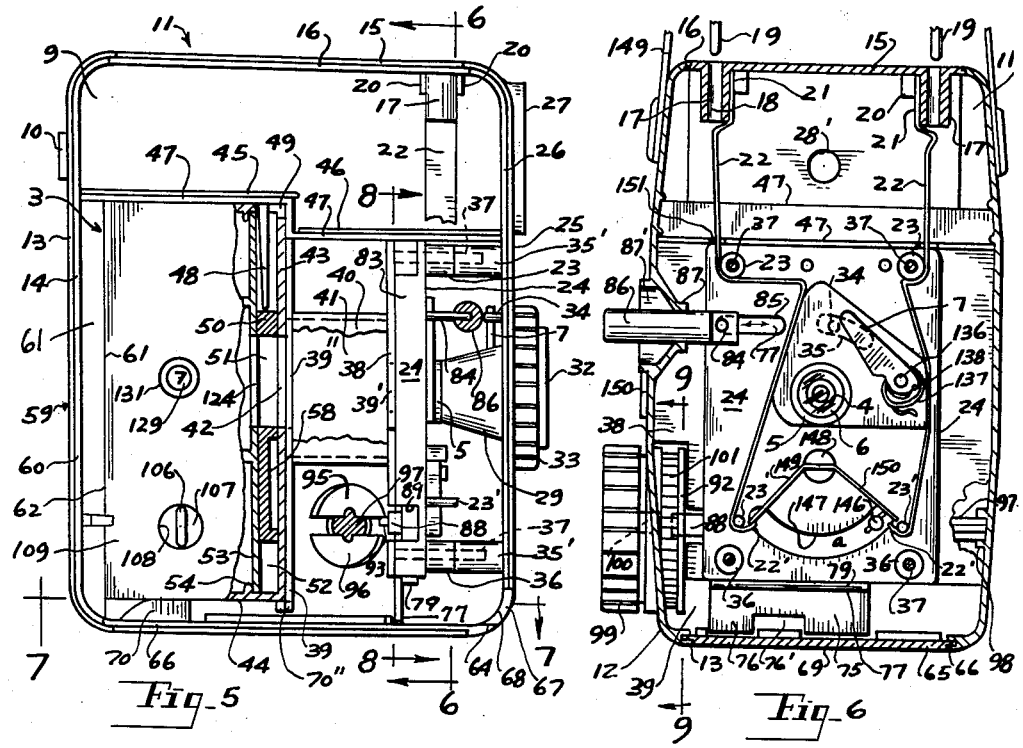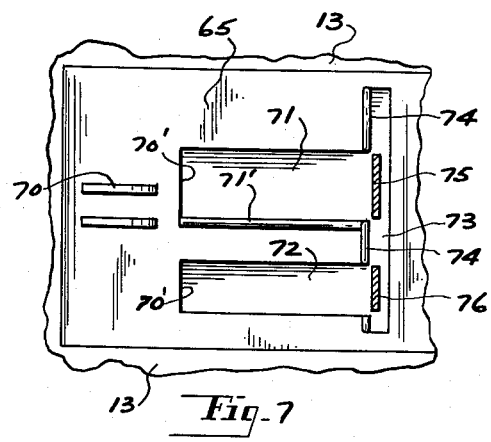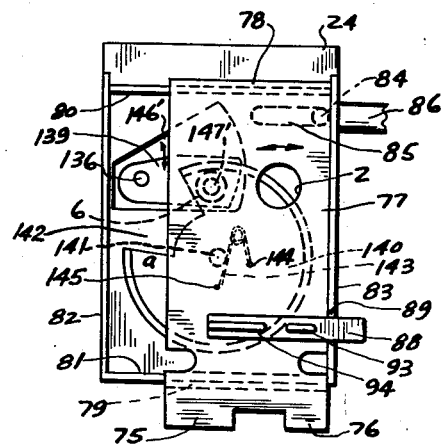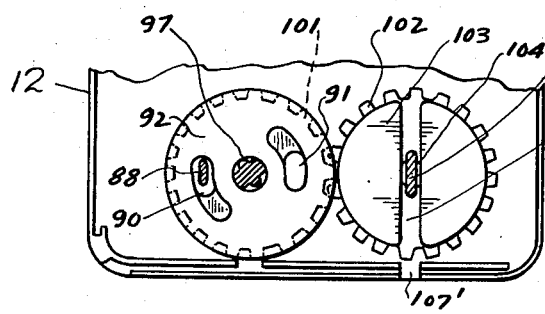

This invention relates to a camera construction, and more particularly to a magazine type of camera.

It is the object of the present invention to provide a novel camera construction whereby it is impossible to accidentally make a double exposure of the film.

It is the further object of the present invention to provide a structure whereby the shutter operating plunger is rendered inoperative after an initial film exposure until the exposed film has been moved forwardly upon a supporting film reel.

It is the further object of the present invention to provide a push button type of shutter which will not reset itself until the film has been advanced.

It is the further object of the present invention to incorporate a film winding knob which is also adapted to reset the shutter within the camera and to reset the shutter operating button.

These and other objects will be seen from the following specification and claims in conjunction with the appended drawings, in which:

FIG. 1 is a side elevational view of the camera showing the film winding knob and shutter operating push button and with the carrying strap fragmentarily shown.

FIG. 2 is a front elevational view of the camera.

FIG. 3 is a fragmentary elevational view of the camera shown in FIG. 1, but with the bottom door slidably opened and with a portion of the removable film magazine projecting down through the outlet opening in the bottom of the camera.

FIG. 4 is a bottom plan view of the camera with the said bottom door in open position.

FIG. 5 is a section taken on line 5—5 of FIG. 2.

FIG. 6 is a section taken on line 6—6 of FIG. 5.

FIG. 7 is a fragmentary section taken on line 7—7 of FIG. 5.

FIG. 8 is a fragmentary section taken on line 8—8 of FIG. 5.

FIG. 9 is a fragmentary section taken on line 9—9 of FIG. 6.

It will be understood that the above drawings merely illustrate a preferred embodiment of the invention and that other embodiments are contemplated within the scope of the claims hereinafter set forth.

Camera casing

Referring to the drawings, the present camera casing is preferably constructed of a plastic or equivalent material and includes a pair of opposed upright side walls 11 and 12 which have continuous inwardly directed marginal flanges 13, and inwardly of said flanges there is provided a continuous peripheral and depressed assembly ledge 14. There is provided the transverse top wall 15 having lateral depressed side flanges 16 which cooperate with flanges 13 of the side walls and their corresponding ledges 14 whereby the top wall is retained in position upon assembly of the side walls.

A pair of cylindrical bosses 17 depend from the forward edges of cover 15 and are longitudinally apertured at 18, which aperture continues out through the cover body, adapted to slidably receive the connection prongs 19 shown in FIG. 6, which form a portion of a syncronizing flash mechanism. The said prongs are adapted to project down through the said slots 18 until their ends are in contact with the respective conductors 22, whose upper ends bear against the interior portions of the said bosses and lie between the oppositely arranged pairs of retaining plates 20 shown in FIG. 5 whereby said upper ends of the conductors are retained against lateral displacement. The said conductors 22 are supported in an upright position and bear against the intermediate shutter housing 24 extending around the bosses 23 on said housing and thence downwardly so that the free ends 22' of the said conductors extend around the projecting bosses or pins 23', as shown in FIG. 6, which bosses also form a part of the shutter housing, hereafter described in further detail.

The camera includes an upright front wall 25 having the upright outwardly directed and depressed marginal flanges 26 which also cooperatively engage the flanges 13 of the said side walls 11 and 12 and their corresponding depressed ledges 14 whereby upon assembly of the said side walls the front wall is retained therebetween.

The upper portion of the said front wall has formed therein a rectangularly shaped boss 27 defining therein a rectangular view finder opening 28 and which is adapted for longitudinal registry with the horizontal axis of the viewing opening 28' within the sighting boss 10 formed upon the rear wall 59 of the said camera and which communicates with the interior chamber 9 of the said camera and whereby there is provided an eye-level view finder so that the picture taker will obtain a picture of what he sees through the said eye-level view finder.

The conically shaped image receiving aperture 29 is suitably secured to the front wall 25, projecting through an opening therein, and includes an annular flange 32 at its outer end adjacent a cylindrical portion thereof over which is rotatably journaled the aperture control ring 33 which has the two spaced designations thereon, "C" for cloudy and "B" for bright, one of which designations is adapted for registry with the stationary pointer "S" marked upon the central portion of the said front wall.

Said image control ring is manually rotatable to one of the two positions for controlling the moving into and out of registry with the camera lens and forwardly thereof a reduced size aperture, hereafter described in conjunction with FIG. 8.

The said aperture defining housing 29 has at its inner end an image opening 30 and formed within inner portions of the said aperture housing 29 are a series of concentric annular ledges 31 of progressively increasing diameter. The said aperture control ring 33, as shown in FIG. 5, has a rearwardly projecting pin 34 which extends through an elongated slot 35 formed through the said front wall and is adapted for operative engagement with lever 7, hereafter described.

Projecting rearwardly from the said front wall, there are provided a pair of upper transversely spaced apertured bosses 35' and a second lower pair of transversely spaced apertured bosses 35', which bosses are adapted for cooperative opposed registry with a corresponding two pairs of forwardly extending bosses 23 and 36, which extend forwardly from shutter housing 24, which latter bosses are also transversely apertured for registry with the apertures in the front wall bosses 35' and which are adapted to cooperatively and supportably receive a set of forwardly projecting elongated pins 37 which extend forwardly from the upright partition plate 38 to thereby provide a positive means of supporting the said shutter housing, as well as the central partition plate 38 and the second upright parallel spaced partition plate 39, which are interconnected by a cylindrical member 40. This member has a cylindrical opening 39" therein adapted for registry with the rectangular image receiving aperture 42 formed in the front wall 43 of the film magazine 44, hereafter described. The opposite end of the cylindrical passageway 41 terminates in the reduced aperture 39' which registers with the lens 6 carried within a circular boss 5 on the front wall of shutter housing 24.

Opposed horizontal bosses 45 are formed upon the interior surfaces of the side walls 11 and 12 in parallel relation and parallel thereto, respectively, and arranged downwardly are an additional pair of opposed inwardly projecting bosses 46 on each of the said side walls 11 and 12 adapted to be cooperatively engaged by the Z-shaped horizontally disposed partition wall 47 which extends laterally between the said side walls and horizontally between front wall 25 and rear wall 59 to thereby define the upper chamber 9 which forms a part of the eye-level view finder in cooperation with the apertured eye piece 10 in said rear wall and the enlarged rectangular view opening 28 formed in the front wall 25.

The wedge shape elongated prong 48 projects downwardly from a central portion of partition 47 and is adapted to be projected longitudinally through the rectangular aperture 49 formed in the top wall of film magazine 44 as and when the said magazine is projected up into the chamber 3 within the camera housing below partition 47, and rearwardly of partition 39.

The said film magazine includes the outer upright front wall 43 and spaced inwardly thereof a second upright partition 53 having a central rectangular aperture 124, FIG. 5, communicating with the interior of the said magazine, which aperture is normally closed by the wall portion 58 of the reciprocal slide 50 when the magazine has been withdrawn from the camera case.

A spring, not shown, is anchored at one end to the plate 53, and at its opposite end is joined to the lower portion of the gate 58 and is adapted to normally retain the closure portion 58 or gate in registry with the aperture 124.

As the magazine is projected into chamber 3 within the camera, the prong 48 operatively engages the sliding closure 50, moving the same downwardly to the position shown in FIG. 5 so that the upper aperture 51 is then in registry with the opening 124 in wall 53 of the said magazine to permit exposure of the film upon operation of the camera shutter in the manner hereafter described.

The closure 58 is slidably mounted upon partition wall 53 between the upright parallel guides 52 which project forwardly of partition wall 53.

The inner partition 53 of said magazine is retained in spaced relation to the outer wall 43 by the transverse bosses 54 which project inwardly from the respective top and bottom walls of the magazine in the manner illustrated in FIG. 5.

The said rear wall 59 of the camera case has formed upon the interior thereof a pair of parallel spaced upright flanges 61 whose inner upright edges are adapted to cooperatively receive and engage the rear upright wall 62 of magazine 44 as the same is projected into the camera casing, as illustrated in FIG. 4, through the rectangularly shaped inlet 63 which communicates with the interior chamber 3.

The ledges 14 which form a portion of the lower inwardly directed flanges of the said side walls 11 and 12 run out as at 64 to provide an entrant opening through which the bottom wall 65 may be horizontally slid.

Said bottom wall has a pair of upwardly displaced outwardly projecting flanges 66 adapted to cooperate with the outer flange 13 of the said side walls whereby the said bottom wall may be slidably supported upon the camera casing.

The said rear wall 59 has a pair of inwardly displaced outwardly projecting longitudinal flanges 60 which cooperate with the corresponding flange 13 and ledge 14 in the opposed side walls whereby upon assembly thereof, the said rear wall is retained in proper assembled relation.

The forward portion of bottom wall 65 is upturned as at 67 and is adapted to nest within a correspondingly shaped cut-away portion 68 adjacent the lower edge of front wall 25 so as to cooperatively blend with the outer lower curvature of the casing including the side walls when the said bottom wall is in fully closed position, as in FIG. 5.

A knurled or abraded plate 69 projects slightly below and forms a part of bottom wall 65 to facilitate manual sliding movements of said bottom wall, as indicated in FIG. 4.

Upon the interior surface of the said bottom wall, and as shown in FIG. 7, there are provided a pair of upright parallel spaced flanges 70 which are adapted to limit the outward sliding or positioning of the magazine 44 normally urged outwardly by a spring, not shown. Thus on withdrawal of bottom door 65 as in FIG. 3, said spring partially ejects magazine 44, facilitating its removal. Said flanges are adapted to slidably project through the undercut slot 70" in the lower edge of partition 39, and edges 70' of slots 71 and 72 in wall 65 will be limited in their outward movements on operative engagement with portions 75 and 76 of shutter 77. The outward movement of said bottom wall will be sufficient to permit removal or insertion of magazine 44 in the manner shown in FIG. 4.

The pair of depressed slotted formations 71 and 72, with flat bottom walls, communicate at their forward ends in a transverse depressed wall portion 73, there being the bounding upwardly projecting boss 71' intermediate the slots 71 and 72, and the additional upright bosses 74 which are arranged in spaced relation and which are displaced from the open ends of the said slots 71 and 72.

The purpose of these slots is to provide a clearance to receive the lower spaced end portions 75 and 76 of the said shutter 77, only when the said shutter has been properly returned to its inoperative position.

This means that, and by virtue of the mechanism hereafter described, the bottom wall or door 65 may not be withdrawn until the shutter 77 is returned to the position shown in FIG. 7, so that on withdrawal of the said bottom wall, the lower ends of the portions 75 and 76 are free to ride within the slots 71 and 72. This means that the bottom wall may not be opened until the exposed film produced by the lateral movement of the shutter has been fed, and at the same time the shutter reset to the inoperative position shown in FIG. 4.

*Camera shutter*

The present shutter, as first mentioned, consists of an upright plate 77, which, under the action of the push button 86 above mentioned, is adapted to slide horizontally and in an upright position. For this purpose there are provided upon the shutter adjacent its upper and lower ends the forwardly extending flanges 78 and 79 which are adapted to engage slidably the rearwardly projecting flanges 80 and 81 forming a part of the shutter housing 24.

As shown in FIG. 5, the said shutter housing bears against the partition 38 to thereby close off the interior thereof, said shutter housing including the upright side flanges 82 and 83, which flanges form the side walls of the shutter housing 24 and at the same time are adapted to limit the horizontal sliding movements of shutter 77, as indicated in FIG. 8.

The pin 84 projects forwardly from shutter 77 and extends through the elongated slot 85 formed in the front wall of the shutter housing 24 and is adapted to be received within a transverse aperture in the inner end of push button 86 in the manner shown in FIG. 6.

Said push button is slidably guided through a formed boss 87 in side wall 12, which boss has an outer depression 87' to accommodate the finger of the user as the said plunger or push button is projected inwardly.

Accordingly, upon inward projection of said push button, the shutter 77 will be projected laterally and in an upright position within the said shutter housing from the position shown in FIG. 8 to a second position to the left thereof until the said shutter engages the side wall flange 82 of the shutter housing, also shown in FIG. 8.

The shutter has a transverse circular aperture 2 which, in the inwardly projected position, will be in axial registry with the lens 6 mounted upon the outer surface of the shutter housing to permit a momentary exposure of the particular film as the shutterfly disc 140 is momentarily and resiliently rotated in a clockwise direction from the position shown in FIG. 8.

As shown in FIG. 8, the said disc has a central aperture for receiving the formed pin 141 which projects rearwardly from the interior wall of the shutter housing against which the said disc is rotatably mounted.

The said shutterfly disc is thus interposed between the front wall of the shutter housing and the front wall of the shutter and includes a cut-away arcuate sector 142. In the position of disc 140, shown in FIG. 8, the said disc overlaps the lens 6 and the aperture 39', as well as the forward aperture 30 normally closing off light communication to the interior of the camera.

A formed spring 143 is interposed between the said disc and the shutter and at one end as at 144 is anchored to the shutter. The opposite end of the spring is anchored at 145 to the said disc. Accordingly, as the shutter 77 is projected to the left of FIG. 8, the said disc will be quickly rotated in a clockwise direction so that the open sector 142 momentarily permits light communication through the lens to the interior of the camera and the interior of the film magazine. However, the spring is so constructed that the disc will continue moving so as to again close off light communication through the said lens 6.

In the manner hereafter described, mechanical means are provided for returning the shutter to the position shown in FIG. 8. As this is done, the said spring 143 is again effective for returning the shutterfly disc 140 to the initial position shown in FIG. 8, ready for the next exposure, with a type of snap action.

Said disc towards its lower end has a forwardly projecting stud 146, FIG. 6, which loosely extends through the arcuate slot 147 formed in the front wall of the shutter housing 24.

Circular boss 148 is formed upon said front wall above slot 147 and is transversely slotted to centrally receive and support the inverted U-shaped electrical conductors 149 and 150 which are flexible. For illustration, in FIG. 6, conductor 149 engages at its free end the upturned portion 22' of the flash conductor strip 22. The other conductor 150 is spaced slightly from the corresponding lower end 22' of the second flash conductor 22, being held in such spaced relation by a lateral projection on the pin 146 as said pin is in one of its extreme positions within slot 147.

Just as soon as the shutter is activated manually, the said disc 140 will rotate to its second position with the said pin 146 riding in slot 147. Accordingly, there is a momentary closing of the electrical circuit through conductor 150 to thereby permit energization of a synchronizing flash attachment, which is not shown in the drawing, except for the connecting prongs 19 of FIG. 6. It is apparent, however, that there will be a momentary closing of an electrical circuit to the conventional type of flash synchronizer such as will provide a momentary additional illumination if desired of the object being photographed.

As the mechanism of the flash synchronizer, with its source of electrical energy, forms no part of the present invention except that said invention is adapted for the use therewith, further detail as to such flash synchronizer is omitted.

It is apparent also that as the disc 140 is rotatably snapped to its second position on activation of the shutter, the said disc and its projecting pin 146, when moved to the opposite end of slot 147, will disengage conductor 149 from conductor 22, breaking the electrical circuit.

As the shutter is manually returned by the operating mechanism, hereafter described, back to its initial position, the said disc 140 and the projecting pin 146 will again be snap returned to the initial position shown in FIG. 6, again moving contact 150 out of engagement with the contact 22' at the lower end of conductor 22.

The arm 88 is secured to and lies against shutter 77 and projects laterally therebeyond, as shown in FIG. 8, and is adapted to slidably extend loosely through the slot 89 formed in the side wall of the shutter housing 24 and a corresponding slot in partition 38. The free end of the arm 88, in the position shown in FIG. 8, is nested as shown in FIG. 9 within one of a pair of 180 degree related slots 90 and 91 formed in the disc 92. This means that with the shutter in its inoperative position ready for the next exposure of the film, the said projection 88 interlockingly engages the disc 92 so as to prevent a further feed movement of the film through the film winding knob 99 until the said knob is released by activation of the push button 86 which moves shutter 77 to the left of FIG. 8 and momentarily disengages the arm 88 from the disc 92 which is secured to the film winding knob 99 in the manner hereafter described. Arm 88, as in FIG. 6, prevents rotation of disc 92 and knob 99 in either direction. When the shutter has been advanced, one of the discs 95 or 96 will engage the arm projection 93, preventing rotation of knob 99 in a counterclockwise direction.

The arm 88 has formed in its exterior surface a pair of horizontally disposed longitudinally spaced lateral projections 93 and 94 which extend rearwardly of the said shutter and are adapted to receive therebetween alternately one or the other of the pair of semi-circularly shaped discs 95 and 96 which are secured centrally upon opposite sides of the transverse winding shaft 97 substantially at right angles to each other, and which discs are adapted alternately for mechanically returning the said shutter from an extreme position to the left of the position shown in FIG. 8 back to the position shown in FIG. 8, with the said discs 95 or 96 camming between the said projections 93 and 94.

The construction of the said discs is such as shown in FIG. 4, that once one of the said discs has cammed or returned the shutter to its initial inoperative position, as shown in FIG. 4, the opposite edge of the other disc will be blocked from further rotary movement by the under surface of the lateral projection 94. Accordingly, the second disc may not be employed operatively to return the shutter unless and until the said shutter has been again mechanically projected to the left as in FIG. 8, so that the end portion of the said disc 95 is in registry with the space between the two lateral projections 93 and 94.

The formed shaft 97 is journaled transversely through the said housing with one end supported within the boss 98 in side wall 11. The opposite end of the shaft extends through side wall 12 and is secured at 100 to the film winding knob 99. The gear 101 is also secured upon shaft 97 upon the interior of the side wall 12 and is adapted for rotation in unison with the knob 99.

The said gear, in the manner hereafter described, is adapted to effect a 180 degree rotation of the film winding reel within the film magazine.

It may be clear from the above description, however, that the turning of the knob 99 rotates the discs 95 and 96 so that the shutter 77 will be mechanically returned to its inoperative position in FIG. 8. At that point the end of the projection 88 extends within one or the other of the other of the two slots 90 or 91 formed upon the disc 92, which disc is immovably secured to the said gear 101 for movement in unison. This means also that once the said shutter has been mechanically returned through the action of one of the two discs 95 or 96, the knob may not be rotated further until the shutter has been again activated by the plunger 86.

Accordingly, there can never be a double exposure of a film, inasmuch as the returning projection 88 nests within one of the slots 90 or 91 and thus retains the disc 92 and the gear 101 attached thereto against further rotation.

In other words, the winding knob 99 may only be rotated 180 degrees at one time. This knob in effect returns the shutter 77 from its film exposing position to the inoperative position in FIG. 8, at which time the knob is now locked against further rotation.

It follows, therefore, that the knob may not be rotated again unless and until the push button 86 has again moved the shutter laterally, at the same time disengaging the bar 88 from one of the slots 90 or 91.

Film feeding mechanism

Referring to FIG. 9, there is provided a second gear 103 journaled at 104 upon the interior of side wall 12 whose teeth 102 are in mesh at all times with gear 101. Gear disc 103 has a transverse central slot 105 extending thereacross which, in the upright position shown, is in alignment with a corresponding lateral slot 107' formed in the casing, also shown in FIG. 4.

The film magazine 44 carries a film feeding spool, an end portion of which as at 107 projects through and is journaled within aperture 108 in wall 109 of the said film magazine. Operating key or plate 106 projects through the said opening 108 and is adapted to loosely slide through slot 107' in the casing and operatively into the slot 105 in the film feeding gear 103, when the said gear is in the position shown in FIG. 9.

Upon wall 109 of magazine 44, FIG. 5, there is formed therethrough an aperture 131 with which the indicia will alternately register as a film feeding is rotated intermittently upon each activation of a film driving spool throughout a measured distance of 180 degrees.

Accordingly, each time an unexposed film segment is fed into proper registry with aperture 124, the next successive number will appear in registry with magazine aperture 131. Furthermore, the corresponding wall 12 of the casing has a corresponding apertured boss 150 through which the said number may be viewed. This will indicate to the user of the camera exactly the number of the film element which is up for the next succeeding exposure and will also indicate when each of the film elements has been used.

It will be recalled that the same handle 99 which was used to return the shutter to its inoperative position through a rotation of 180 degrees, and which was limited to a 180 degree rotation, at the same time through the similar gears 101 and 102 also effected a 180 degree rotation of a film feeding spool in magazine 44.

Accordingly, it is apparent that one of the objects of the present invention is attained, i.e., the prevention of a double exposure, inasmuch as there cannot be a second 180 degree rotation of the knob 99 unless and until the shutter has been returned to its operative position, and at the same time there has been a concurrent 180 degree of feeding of the film spool moving the next film square into proper registry.

At the same time, the returning of the shutter 77 to its inoperative position has also recocked the shutterfly disc 140, snapping the same back to the initial position shown in FIG. 8 and ready for the next exposure.

As the magazine is withdrawn from the camera casing on opening of the bottom door or wall 65, as shown in FIG. 3, it is apparent that there will be a relative movement of the door 50 with respect to the activating prong 48, FIG. 5. Accordingly, as the said magazine is withdrawn, the door 50 under the action of a spring will be returned to the initial sealing position with wall 58 registering with aperture 124, to thereby prevent the entry of any light into the magazine as it is removed from the camera. By this construction, the magazine may be safely removed in light sealed condition for precessing of the film in a conventional manner.

Referring now to FIG. 8, the above-mentioned aperture control consists of a plate 139 which is fixedly connected at one end as at 136 to the shaft of crank 7, and accordingly will rock with the said crank from the position shown in FIG. 8 in registry with lens 6 to an upper position out of said registry. Plate 139 moves in a depressed slot 146' formed in the front wall of the shutter housing 24. There is a transverse reduced aperture 147' formed through plate 139 which will axially register with the said lens when the plate 139 is moved to the position shown in FIG. 8 to thereby reduce the amount of light which will pass through the said lens. This position will correspond to the registry of the letter "B," FIG. 2, with the pointer 8 upon rotation of ring 33, i.e., an F16 opening. Aperture 30 corresponds to an F11.

As above described, said ring carries the rearwardly projecting pin 34, FIG. 5, which engages the crank 7, which is spring-biased as at 137—138, so that the said crank is maintained in engagement with pin 34, as also shown in FIG. 6. Accordingly, in the other direction of rotation of the ring 33, the said spring 137—138 will be effective for returning the crank 7 to an initial position.

Flash synchronizer control

As illustrated in FIGS. 6 and 8, the shutterfly disc 140 is rotatably journaled at 141 and responds to lateral movements of the shutter 77 by virtue of the formed spring 143 to thereby attain a quick snapping action from the position shown in FIG. 8 to a second position not shown, but wherein the disc 140 has rotated less than approximately 90 degrees in a clockwise direction. This momentarily permits the open sector 142 of said disc to pass the lens opening and to again close the same, permitting the momentary exposure of the film in a conventional manner.

The lower portion of said disc has a forwardly projecting pin 146 which projects through the arcuate slot 147 formed in the lower portion of the front wall of the shutter housing 24. The said pin in engaging the opposite ends of slot 147 thus limits the extent of rotation of the disc 140 in either direction.

Boss 148 with a transverse slit thereacross projects forwardly of the front wall of the said shutter housing, FIG. 6, and has mounted thereon a pair of flexible conductors 149 and 150, whose free ends are adapted for alternate and simultaneous contact with the two reverse turned contact elements 22' at the lower ends of the flash activating conductors 22.

In FIG. 6 it is seen that conductor 149 is in engagement at its free end with contact 22' on the left side. However, in the extreme position of the said disc the pin 146 holds the second contact 150 in spaced relation to the second stationary contact 22'. Accordingly, just as soon as the shutter 77 is activated laterally by the push button to cause a corresponding quick movement of the shutterfly disc 140 under the action of spring 143, the said pin 146 will release contact 150 so that it engages the free end 22' of the second conductor 22 to thus close the electrical circuit to a synchronizing flash mechanism, whose mounting and contacting prongs 19 are fragmentarily shown in FIG. 6 and which when inserted through the bosses 17 in the cover 15 are in electrical connection with the conductors 22.

Just as soon as the disc reaches the limit of its rotary movement, approximately 90 degrees, the said pin 146 engages the contact arm 149 and breaks the circuit with contact 22' on the left side of FIG. 6.

In the resetting of the shutter in the manner above described, of course, the disc 140 is returned to its initial position, which means that the said pin 146 will again take the inoperative position shown in FIG. 6, breaking the electrical connection between contact 150 and contact 22'.

Upon the upper ends of the two side walls 11 and 12 are a pair of mounting buttons 151 adapted to receive the free ends of a suitable flexible carrying strap 152, as fragmentarily illustrated.

An additional advantage resides in the fingerwell 87, FIG. 6, which is depressed below the general surface of the casing sidewall 12, to thereby accommodate the user's finger when applying the shutter actuating push button 86. Should the said casing be laid upon its side upon a flat surface, or engage an object which would move the end of the said push button flush with the outer casing, such inward movement would be insufficient to effect operation of the shutter and consequent exposure of a film. The well formation 87 provides for additional longitudinal inward movement of the said push button sufficient to operatively activate the said shutter.

An additional advantage of the present removable magazine construction is that once an exposed film has been properly advanced, the said magazine may be removed from the camera casing even though all of the film elements have not been exposed, inasmuch as, upon opening of the bottom door 65 to the position shown in FIG. 3, the said magazine will be partially ejected to the position shown.

At the same time, and in view of the spring-biasing of the gate or door 50—58, the said door will automatically close as the said magazine is withdrawn from the camera casing. This means that the said magazine will be fully sealed against the entry of light. The removal of the said magazine will thus permit the insertion of another magazine which may be, for example, intended for a specific group of pictures. On the other hand, it may be desired to insert temporarily a magazine containing color film. In any event, the present magazine construction permits the removal thereof whenever desired for changing or for temporary substitution.

Having described my invention, reference should now be had to the claims which follow for determining the scope thereof.

I claim:

1. In combination, an apertured casing, an upright shutter housing mounted within said casing having a transverse aperture mounting a lens, an upright shutter slidably mounted upon said housing for reciprocal lateral adjustments and having an aperture adapted for movement into registry with said lens, a pushbutton slidably mounted on said casing and at its inner end operatively connected to said shutter for moving the same and its aperture into registry with said lens, a manually rotatable shaft journaled within said casing, a pair of semi-circular right angularly related opposed discs secured upon opposite sides of said shaft, each at an acute angle to the shaft axis, a slotted operating bar projecting from said shutter, one of said discs extending into the slot of said bar adapted on rotation of said shaft 180 degrees to cam against said bar slidably returning said shutter to its initial operative position.

2. In combination, an apertured casing, an upright shutter housing mounted within the casing having a transverse aperture mounting a lens, an upright shutter slidably mounted upon said housing for reciprocal lateral adjustments and having an aperture adapted for movement into registry with said lens, a pushbutton slidably mounted on said casing and at its inner end operatively connected to said shutter for moving the same and its aperture into registry with said lens, a rotatable shaft journaled within said casing, a slotted operating bar projecting from said shutter, cam means on said shaft extending into the slot of said bar for slidably returning said shutter operating bar and pushbutton to operative position, and a disc on said shaft having a pair of 180 degree related recesses therein, said operating bar extending laterally from said shutter retainingly registerable when returned to operative position within one of said recesses for limiting rotation of said disc and shaft to 180 degrees.

3. In a camera, a casing with an image aperture, an upright shutter plate mounted within said casing for reciprocal lateral adjustments and having an aperture adapted for intermittent registry with said first aperture, a pushbutton on said casing operatively connected to said shutter for moving it in one direction into film exposing position, a manually rotatable shaft extending through said casing and journaled therein, cam means on said shaft operatively engaging said shutter on rotation of said shaft for mechanically returning said shutter and pushbutton to operative position, a disc secured on said shaft having a pair of 180 degree related recesses therein, and an operating bar extending laterally from said shutter with its end registerable within one of said recesses on return of said shutter to its initial position for limiting rotation of said disc and shaft to 180 degrees.

References Cited in the file of this patent

UNITED STATES PATENTS

| | | |
|---|---|---|
| 516,861 | Fawcett | Mar. 20, 1894 |
| 1,749,523 | Willson | Mar. 4, 1930 |
| 1,799,879 | Wittel | Apr. 7, 1931 |
| 1,909,597 | Thompson | May 16, 1933 |
| 1,977,569 | Hineline | Oct. 16, 1934 |
| 2,007,468 | Fear | July 9, 1935 |
| 2,194,031 | Biszdorfer | Mar. 19, 1940 |
| 2,238,491 | Hutchison | Apr. 15, 1941 |
| 2,293,195 | Cohen | Aug. 18, 1942 |
| 2,412,559 | Bolsey | Dec. 17, 1946 |
| 2,453,321 | Hutchison | Nov. 9, 1948 |
| 2,553,656 | Kirby | May 22, 1951 |
| 2,625,087 | Steineck | Jan. 13, 1953 |
| 2,664,799 | Wilkinson | Jan. 5, 1954 |
| 2,679,196 | Sochor et al. | May 25, 1954 |
| 2,741,168 | Schreiber | Apr. 10, 1956 |
| 2,742,835 | Owens | Apr. 24, 1956 |

FOREIGN PATENTS

| | | |
|---|---|---|
| 694,571 | Great Britain | July 22, 1953 |